(12) United States Patent
Rehm et al.

(10) Patent No.: US 9,229,661 B2
(45) Date of Patent: Jan. 5, 2016

(54) TOTAL QUOTAS FOR DATA STORAGE SYSTEM

(71) Applicant: Silicon Graphics International Corp., Fremont, CA (US)

(72) Inventors: Kevan Flint Rehm, Brooklyn Park, MN (US); Benjamin Paul Myers, Bloomington, MN (US)

(73) Assignee: SILICON GRAPHICS INTERNATIONAL CORP., Fremont, CA (US)

( * ) Notice: Subject to any disclaimer, the term of this patent is extended or adjusted under 35 U.S.C. 154(b) by 144 days.

(21) Appl. No.: 13/897,215

(22) Filed: May 17, 2013

(65) Prior Publication Data

US 2014/0281214 A1 Sep. 18, 2014

Related U.S. Application Data

(60) Provisional application No. 61/786,444, filed on Mar. 15, 2013.

(51) Int. Cl.
*G06F 12/00* (2006.01)
*G06F 3/06* (2006.01)
*G06F 11/14* (2006.01)

(52) U.S. Cl.
CPC ............ *G06F 3/0689* (2013.01); *G06F 3/0617* (2013.01); *G06F 3/0653* (2013.01); *G06F 11/1448* (2013.01)

(58) Field of Classification Search
CPC ... G06F 3/0617; G06F 3/0653; G06F 3/0689; G06F 11/1448
See application file for complete search history.

(56) References Cited

U.S. PATENT DOCUMENTS

| | | | | |
|---|---|---|---|---|
| 5,819,047 A * | 10/1998 | Bauer et al. | ................... | 709/229 |
| 2002/0147733 A1 * | 10/2002 | Gold et al. | ................... | 707/200 |
| 2014/0075029 A1 * | 3/2014 | Lipchuk et al. | ............... | 709/226 |

* cited by examiner

*Primary Examiner* — Aracelis Ruiz
(74) *Attorney, Agent, or Firm* — Lewis Roca Rothgerber LLP

(57) ABSTRACT

Quotas are tracked for user usage of hard disk drive space and offline backup storage space. The quota is enforced against the total space utilized by a user, not just high tier hard drive space usage. When data is migrated from hard disk drive space to backup storage space, data metadata is updated to reflect data kept offline for the user. As such, when users request to store new data, the data usage of hard disk space and backup storage space is determined from the metadata that reflects both data types, and the total storage spaced for the user is used to grant or reject the user's request to store more data in the system.

15 Claims, 5 Drawing Sheets

TOTAL QUOTAS FOR DATA STORAGE SYSTEM

CROSS REFERENCE TO RELATED APPLICATIONS

This application claims the priority benefit of U.S. Provisional Application Ser. No. 61/786,444, titled "Total Quotas for Data Storage System," filed Mar. 15, 2013, the disclosure of which is incorporated herein by reference.

BACKGROUND OF THE INVENTION

1. Field of the Invention

The present invention is related to managing data storage space. In particular, the present invention is related to managing quotas for users of a data storage system.

2. Description of the Related Art

As users and entities use more and more data, data storage space becomes more scarce. Many data storage systems designed for use by multiple users implement data quotas. Each user is allocated a certain amount of data space, as a quota, to use on the data storage systems.

Many data storage systems implement offline or backup storage. When data on primary or hard disk is not high priority, the data may be migrated to backup storage. This helps keep high priority data accessible with quicker access times, such as from hard drives, and keeps lower priority data on slower access systems, such as tape devices.

In data storage systems shared among many users, the quotas are managed for the hard disks. Thus, if a user moves data from hard disk space to offline backup space, the user may reduce the data counted against his quota though may still be using storage space in the offline storage. This can be costly for data storage system providers, as users may utilize more data than they are paying for.

What is needed is an improved method for tracking quotas in modern day storage systems having multiple tiers.

SUMMARY OF THE CLAIMED INVENTION

Quotas are tracked for user usage of hard disk drive space and offline backup storage space. The quota is enforced against the total space utilized by a user, not just high tier hard drive space usage. When data is migrated from hard disk drive space to backup storage space, data metadata is updated to reflect data kept offline for the user. As such, when users request to store new data, the data usage of hard disk space and backup storage space is determined from the metadata that reflects both data types, and the total storage space for the user is used to grant or reject the user's request to store more data in the system.

An embodiment for managing data storage may begin with receiving a request to store data for a user. The total storage space usage may be determined from hard disk storage space usage and back-up storage space usage associated with the user. The total storage space usage may be compared to allowed storage. A response may then be provided to user request based on results of the comparison.

In an embodiment, a method for managing data storage may begin with receiving a request to store data for a user. Next, total storage space usage may be determined from hard disk storage space usage and back-up storage space usage associated with user. The total storage space usage may then be compared to allowed storage and a response may be provided to a user request based on results of the comparison.

In an embodiment, a system for managing data storage may include a processor, a memory and one or more modules stored in memory. The modules may be executed by the processor to receive a request to store data for a user, determine total storage space usage from hard disk storage space usage and back-up storage space usage associated with user, compare total storage space usage to allowed storage, and provide response to user request based on results of the comparison.

DETAILED DESCRIPTION

In the present invention, quotas are tracked for user usage of hard disk drive space and offline backup storage space. The quota is enforced against the total space utilized by a user, not just high tier hard drive space usage. When data is migrated from hard disk drive space to backup storage space, data metadata is updated to reflect data kept offline for the user. As such, when users request to store new data, the data usage of hard disk space and backup storage space is determined from the metadata that reflects both data types, and the total storage space for the user is used to grant or reject the user's request to store more data in the system.

Figure 1:
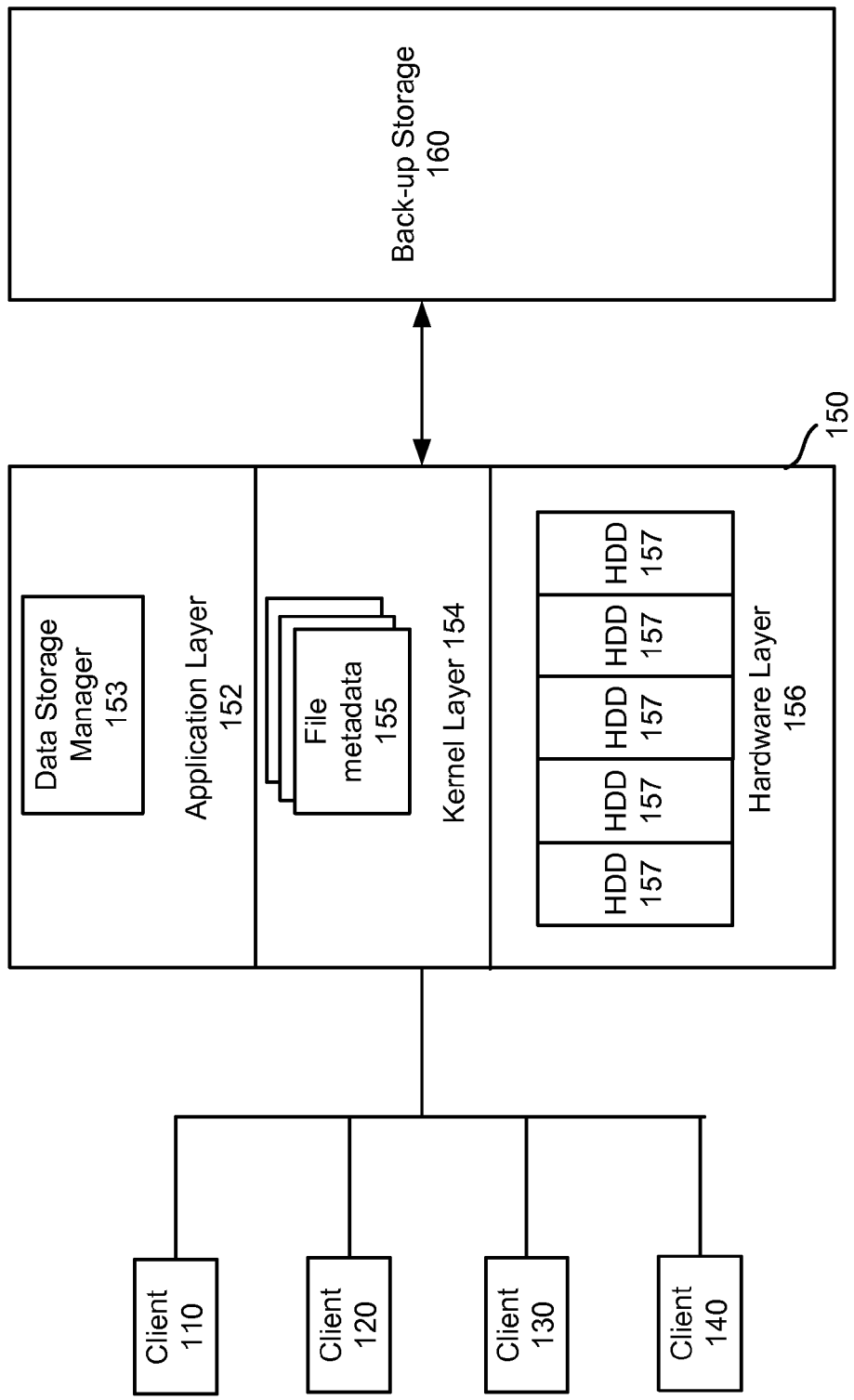
FIG. 1 is a block diagram of a data storage system.

FIG. 1 is a block diagram of a data storage system. The data storage system of FIG. 1 includes clients 110, 120, 130 and 140, hard disk storage system 150, and backup storage system 160. Clients 110-140 may each be operated or associated with a user of the data source system implemented by hard disk system 150 and backup storage system 160. Each of clients 110 through 140 may communicate with hard disk system 150.

Hard disk system 150 may include application layer 152, kernel layer 154, and hardware layer 156. Application layer 152 may be implemented as a software layer which stores and executes applications in other software on the operating system of system 150. Application layer 152 may include data storage manager 153. Data storage manager 153 may manage migration to and from backup storage 160, manage user quotas, and perform other tasks and operations associated with the data storage system.

Kernel layer 154 serves as an interface between application layer 152 and hardware layer 156. Kernel layer 154 may include file metadata 155. In some embodiments, a metadata file may be maintained for each file stored for a user in the data storage system of FIG. 1. Each file metadata file 155 provides information for a particular file, including the name of the file, the user, where the data in the file is stored, and other information. File metadata is discussed in more detail below with respect to FIGS. 2 and 3.

Hardware layer 156 may include hardware which is used within the hard disk drive system 150. The hardware may include input and output devices, storage devices, processors, port expanders, networking devices, and other devices. Hardware layer 156 may also include hard disk drives 157. Data may be stored by clients 110-140 over the hard disk drives 157. Program modules may be stored in memory of the hardware layer and executed by one or more processors to implement the functionality of the present invention.

Backup storage 160 may include lower speed data devices, such as tape drive storage devices. The lower speed data devices may have a slower access rate and lower cost than that associated with hard disk drives 157 of the device 150. In some embodiments, the backup storage 160 may include tape drives.

Figure 2:
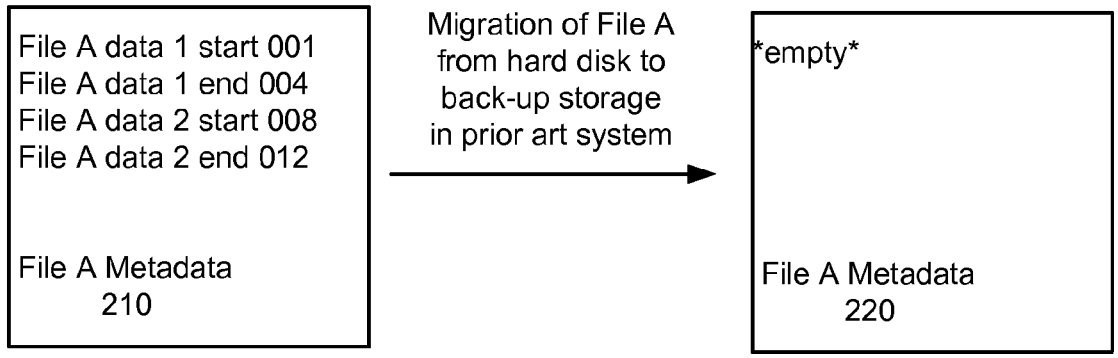
FIG. 2 illustrates changes to metadata files during migration according to the prior art.

FIG. 2 illustrates changes to metadata files during migration according to the prior art. File A metadata 210 illustrates that a particular file is stored in portions and includes intervening holes between the portions. As illustrated, the metadata for file A indicates that file A data portion 1 starts at an address of 001 and ends at an address of 004. Hence, the metadata for file A includes pointers to the start address and end address of the file portions. File A metadata also indicates that a hole exists between the file portions from address 005 to address 007, represented as a gap in the address space. The second portion of file A starts at 008 and ends at 012. After migration of file A from hard disk storage to backup storage in a prior art system, the file A metadata only reflects a single hole, covering the entire address space. As shown in file A metadata 220, file A is empty. No information is provided regarding the size of the data which was sent to offline backup storage. As such, it appears that this file is not taking up any space for the user, and is not being charged any space against the user's quota.

Figure 3:
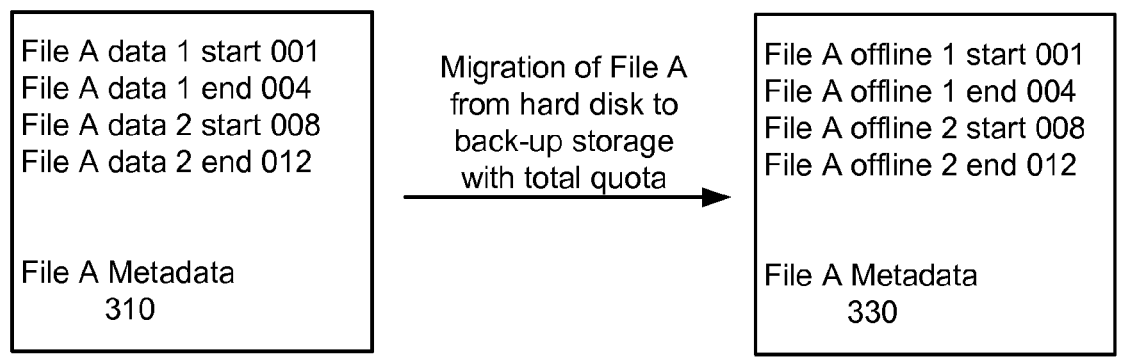
FIG. 3 illustrates changes to metadata files during migration according to the present invention.

FIG. 3 illustrates changes to metadata files during migration according to the present invention. File A metadata 310 appears exactly the same as file A metadata 210 before the file is migrated. After migration of file A 310 from hard disk to backup storage with a total quota system, the metadata relating to the data extents is replaced with offline extents. Hence, the file A portions still include extents which point out the beginning address and ending address of each file portion, but the data extents have been replaced with offline extents—the migrated file is not represented by a single hole extent as in the prior art. Rather, the data is moved offline to backup storage but is still referred to in the metadata file using offline extents.

Figure 4:
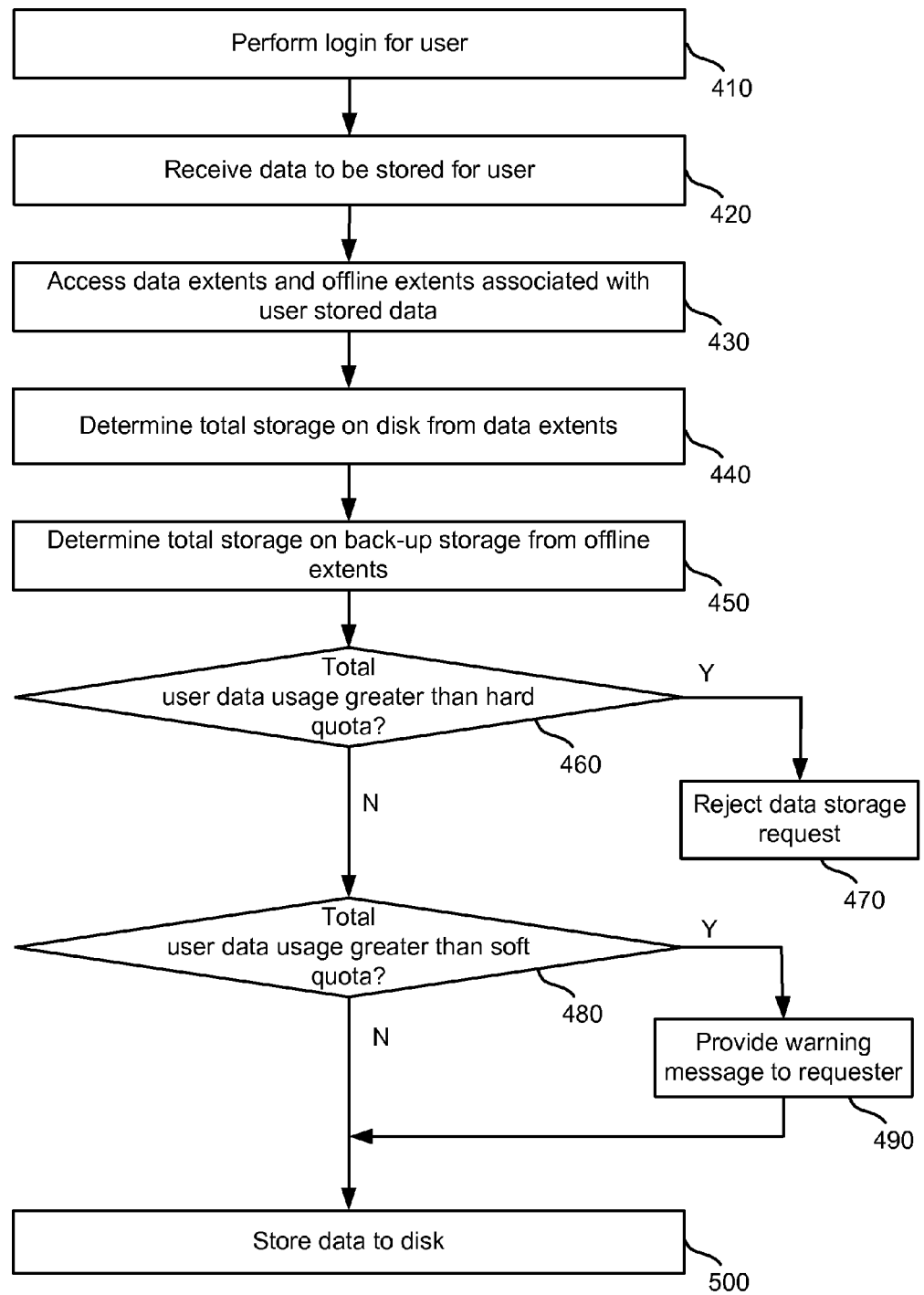
FIG. 4 is a flowchart for storing data for a user using storage quotas.

FIG. 4 is a flowchart for storing data for a user using storage quotas. First, login is performed for the user at step 410. The login may involve a traditional login username and password, or other method to identify the user. This information may be used to track the user's quota. Next, data to store for the user may be received at step 420. For example, the user may attempt to save data through the data storage system. Data extents and offline extents which are associated with the user's stored data may be accessed at step 430. Each time a user attempts to store data, the metadata for all files associated with that user are retrieved and examined to determine the total storage space used by that user. The total storage on disk from the data extents for the user is determined at step 440. To determine the total storage on disk, the file portions for each file as computed from the extent addresses are added up. The total storage on backup storage is determined from offline extents at step 450. The offline extents are added into the metadata when a user file is migrated from hard disk storage to backup storage.

A determination is made as to whether a total user data usage is greater than a hard quota at step 460. A hard quota may be the absolute maximum storage space allocated to a user. If the user's total usage plus the file that the user is requesting to store would be more than the quota, the data request is rejected at step 470. If the total user usage plus the file to be stored is not greater than the hard quota, a determination is made as to whether the total data usage would be greater than a soft quota at step 480. A soft quota may be a quantity of storage space that when met or exceeded, may trigger an action but may still be allowed, for at least a specified period of time such as one day, two days, or three days. If the total usage would be greater than the soft quota, a warning may be provided to the requester at step 490. The warning may inform the user that the data storage usage is getting close to a storage maximum for the user, that the data may only be stored for a temporary period of time before being overwritten, or some other warning. In some instances, the data may be overwritten from hard disk storage after a period of time without permission from the user. After providing the warning, the data may be stored at step 500. If the total user usage is not greater than the soft quota at step 480, the data will be stored to disk at step 500 as well.

Figure 5:
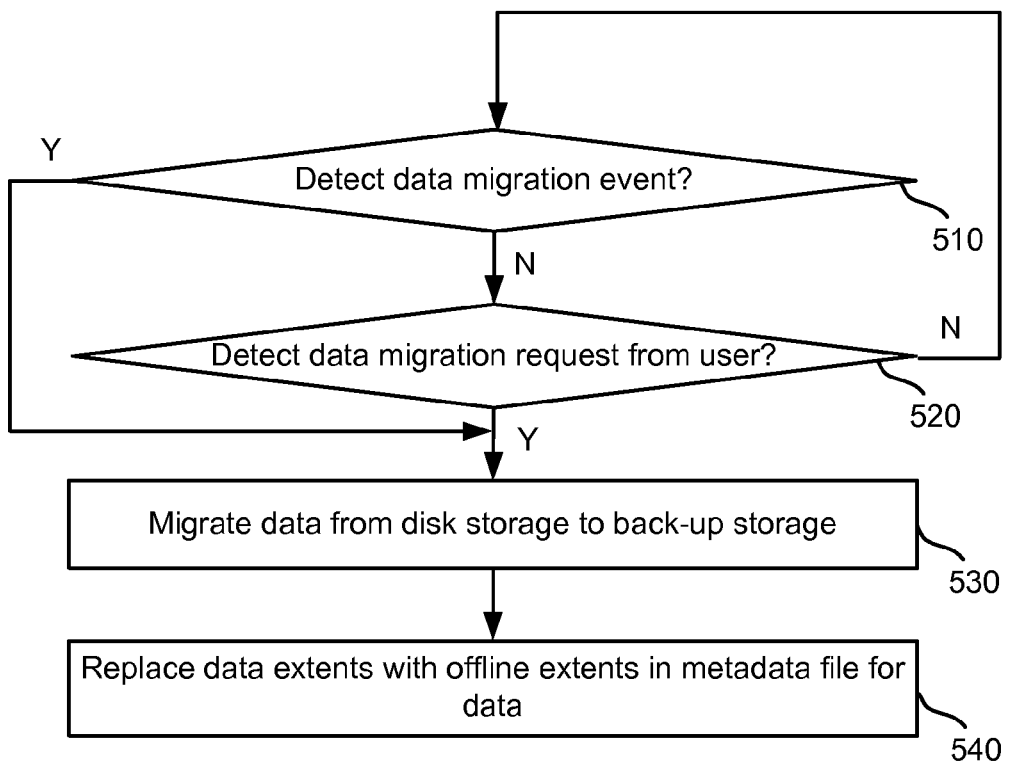
FIG. 5 is a flowchart for migrating data to backup storage.

FIG. 5 is a flowchart for migrating data to backup storage. First, a determination is made as to whether a data migration event is detected at step 510. A data migration event may include a determination that data has been stored for at least a threshold period of time, data is associated with a particular project or user, or some other event relating to lowering the priority of stored data. If a data migration event is detected, the method of FIG. 5 continues to step 530. If data migration event is not detected at step 510, a determination is made as to whether a data migration request from a user is detected at step 520. A data migration request from the user may include request to move data from disk storage to backup storage. In some embodiments, a user may schedule automatic or periodic migrations. If no data migration request is received from a user, the method of FIG. 5 continues to step 510. If the data migration request is received, data may be migrated from disk storage to backup storage at step 530. Migrating data from disk storage to backup storage may include physically copying the data and placing the data in backup storage, as well as replacing data extents with offline extents within file metadata for the block of data moved. Replacing data extents with offline extents is performed at step 540 and may change the file metadata as shown between file metadata 310 and 320 in FIG. 3.

Figure 6:
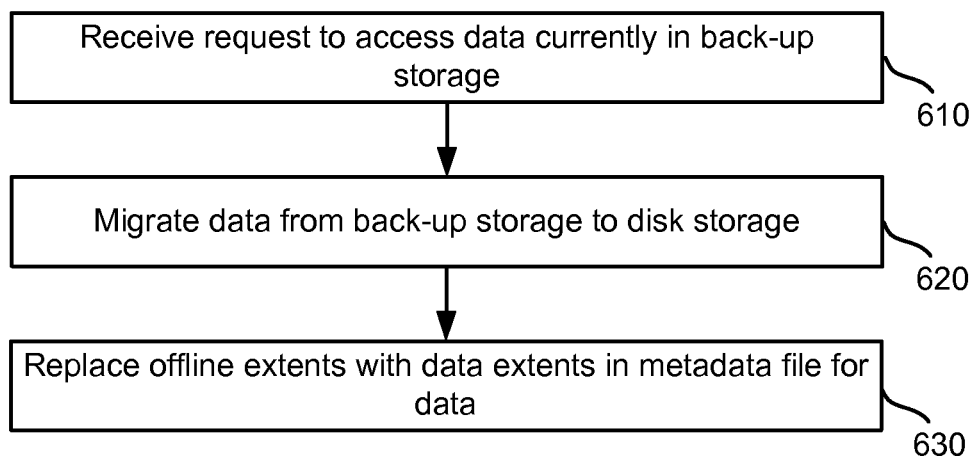
FIG. 6 is a flowchart for retrieving data from backup storage.

FIG. 6 is a flowchart for retrieving data from backup storage. First, a request is received to access data currently in backup storage at step 610. The request may involve a user wishing to access a file which has been moved to backup storage. Data may be migrated from backup storage to disc storage at step 620. Once the data is migrated to disk storage from backup storage, offline extents within the metadata file for that data are replaced by a data storage manager with data extents in the metadata file at steps 630. Hence, the metadata file will change from that shown in metadata file 320 to metadata file 310 in FIG. 3.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:
1. A method for managing data storage, comprising:
receiving a request to store data for a user;

determining a total amount of storage space that is currently consumed by the user, wherein the total amount of storage space currently consumed by the user includes storage space at a hard disk system plus storage space at a back-up storage system, wherein the amount of storage space currently storing data from the user at the hard disk system and at the back-up storage system is stored as metadata at kernel layer at the hard disk system;

comparing a total storage space usage of the user to a total amount of storage space allowed for the user, wherein the total storage space usage includes the total amount of storage currently consumed by the user plus an amount of storage space required to store the data from the user request; and determining that the total storage space usage is less than a hard quota;

writing the data from the user request to the hard disk system; and updating the metadata at the kernel layer at the hard disk system to include information that identifies an amount of storage used to store the data from the user request.

2. The method of claim 1, wherein the total amount of storage space currently consumed by the user is determined from metadata retrieved from the hard disk storage system.

3. The method of claim 2, wherein the metadata includes extents associated with hard disk usage and metadata associated with back-up storage usage.

4. The method of claim 1, further comprising:
determining that the total amount of storage space currently consumed by the user is larger than a soft quota; and
overwriting the data from the user request stored at the hard disk storage system after a period of time without permission from the user.

5. The method of claim 1, further comprising:
moving the data from the user request stored at the hard disk system to the back-up storage system; and
replacing data extents associated with the moved data with offline extents.

6. A non-transitory computer readable storage medium having embodied thereon a program the program executable by a processor to perform a method for managing data storage, the method comprising:
receiving a request to store data for a user;
determining a total amount of storage space that is currently consumed by the user, wherein the total amount of storage space currently consumed by the user includes storage space at a hard disk system plus storage space at a back-up storage system, wherein the amount of storage space currently storing data from the user at the hard disk system and at the back-up storage system is stored as metadata at kernel layer at the hard disk system;
comparing a total storage space usage of the user to a total amount of storage space allowed for the user, wherein the total storage space usage includes the total amount of storage currently consumed by the user plus an amount of storage space required to store the data from the user request; and
determining that the total storage space usage is less than a hard quota;
writing the data from the user request to the hard disk system; and
updating the metadata at the kernel layer at the hard disk system to include information that identifies an amount of storage used to store the data from the user request.

7. The non-transitory computer readable storage medium of claim 6, wherein the total amount of storage space currently consumed by the user is determined from metadata retrieved from the hard disk storage system.

8. The non-transitory computer readable storage medium of claim 7, wherein the metadata includes extents associated with hard disk usage and metadata associated with back-up storage usage.

9. The non-transitory computer readable storage medium of claim 6, the program further executable to:
determine that the total amount of storage space currently consumed by the user is larger than a soft quota; and
overwrite the data from the user request stored at the hard disk storage system after a period of time without permission from the user.

10. The non-transitory computer readable storage medium of claim 6, the program further executable to:
move the data from the user request stored at the hard disk system to the back-up storage system; and
replace data extents associated with the moved data with offline extents.

11. A system for managing data storage, comprising:
a processor;
a memory; and
one or more modules stored in memory and executable by the processor to:
receive a request to store data for a user,
determine a total amount of storage space that is currently consumed by the user, wherein the total amount of storage space currently consumed by the user includes storage space at a hard disk system plus storage space at a back-up storage system, wherein the amount of storage space currently storing data from the user at the hard disk system and at the back-up storage system is stored as metadata at kernel layer at the hard disk system,
compare a total storage space usage of the user to a total amount of storage space allowed for the user, wherein the total storage space usage includes the total amount of storage currently consumed by the user plus an amount of storage space required to store the data from the user request, and
determine that the total storage space usage is less than a hard quota; and
write the data to hard disk storage.

12. The system of claim 11, wherein the total amount of storage space currently consumed by the user is determined from metadata retrieved from the hard disk storage system.

13. The system of claim 12, wherein the metadata includes extents associated with hard disk usage and metadata associated with back-up storage usage.

14. The system of claim 11, the one or more modules further executable to:
determine that the total amount of storage space currently consumed by the user is larger than a soft quota; and
overwrite the data from the user request stored at the hard disk storage system after a period of time without permission from the user.

15. The system of claim 11, the one or more modules further executable to:
move the data from the user request stored at the hard disk system to the back-up storage system; space; and
replace data extents associated with the moved data with offline extents.

* * * * *